United States Patent
Shinagawa et al.

(10) Patent No.: US 7,616,567 B2
(45) Date of Patent: Nov. 10, 2009

(54) SHAPING APPARATUS, COMMUNICATION NODE AND FLOW CONTROL METHOD FOR CONTROLLING BANDWIDTH OF VARIABLE LENGTH FRAMES

(75) Inventors: Taishi Shinagawa, Tokyo (JP); Masanobu Kobayashi, Yokohama (JP); Yoshihiro Ashi, Yokohama (JP); Toru Kazawa, Kokubunji (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 929 days.

(21) Appl. No.: 11/029,570

(22) Filed: Jan. 6, 2005

(65) Prior Publication Data

US 2005/0259578 A1 Nov. 24, 2005

(30) Foreign Application Priority Data

May 21, 2004 (JP) ............................ 2004-151666

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 12/26* (2006.01)
*H04L 12/28* (2006.01)

(52) U.S. Cl. .................. 370/231; 370/233; 370/234; 370/235.1; 370/236; 370/238.1

(58) Field of Classification Search ......... 370/229–236, 370/237–238.1
See application file for complete search history.

(56) References Cited

U.S. PATENT DOCUMENTS 7,023,799 B2 * 4/2006 Takase et al. ............ 370/230.1
2003/0123390 A1 7/2003 Takase et al.

FOREIGN PATENT DOCUMENTS

JP 2003-198611 A 7/2003

\* cited by examiner

*Primary Examiner*—Daniel J. Ryman
*Assistant Examiner*—Nishant B Divecha
(74) *Attorney, Agent, or Firm*—McDermott Will & Emery LLP (57) ABSTRACT

A shaping apparatus comprising a plurality of buffer memories allocated for different flows, bandwidth control units associated with the buffer memories, and a read control unit, wherein each of the bandwidth control units issues a first frame output request based on a maximum allowed bandwidth and a second frame output request based on a minimum guaranteed bandwidth, and the read control unit selects a bandwidth control unit to be permitted for frame output execution out of bandwidth control units that are issuing the first or second frame output request, giving priority to the second frame output request.

9 Claims, 9 Drawing Sheets

PRIOR ART

SHAPING APPARATUS, COMMUNICATION NODE AND FLOW CONTROL METHOD FOR CONTROLLING BANDWIDTH OF VARIABLE LENGTH FRAMES

CLAIM OF PRIORITY

The present application claims priority from Japanese patent application serial No. 2004-151666, filed on May 21, 2004, the content of which is hereby incorporated by reference into this application.

BACKGROUND OF THE INVENTION (1) Field of the Invention

The present invention relates to a traffic shaping apparatus, a communication node and a flow control method for sending out bandwidth controlled variable length frames.

(2) Description of Related Art

Recently, there is an increasing demand for high-speed networks such as broadband services. As one form of high-speed networks, Ethernet base networks that provide low cost communication have wide dissemination. In the Ethernet-base networks, best-effort based communication services in which an allocated bandwidth is determined subject to channel availability are provided, which is suitable for burst packet transmission with a high peak rate. However, a stable bandwidth per user is not guaranteed and temporary channel occupation by a particular user occurs. Thus, the best-effort based communication has such a problem that a stable quality service cannot be assured.

From network users, there is increasing demand for a high-quality communication service in which a minimum bandwidth is guaranteed. Provision of such a communication service is hoped for that a minimum guaranteed bandwidth determined by contract is stably assigned to every user and free bandwidth can be used effectively if occurs. Even if free bandwidth is available, when a packet transfer service exceeding a maximum allowed bandwidth set for each user in advance is performed, buffer overflow might occur at a receiving terminal and received data might be discarded. Therefore, a proper maximum allowed bandwidth should be set for each user and bandwidth must be controlled not to exceed it.

In transferring variable length frames as is done on Ethernet, since a bandwidth in use depends on both the number of frames (packets) and frame length, bandwidth per flow cannot be controlled with the control of the number of frames solely, like the fixed length cell transfer over an ATM network. Here, a frame (packet) denotes a data block comprising a header, payload, and a trailer as a unit of data transfer on a communication network.

As a prior art of variable length data transfer which ensures the minimum guaranteed bandwidth per flow and makes effective use of free bandwidth, a leaky bucket type bandwidth control using a leaky bucket model with a certain depth is known, as described in, e.g., Japanese Unexamined Patent Publication No. 2003-198611 (patent document 1). In the leaky packet based bandwidth control, the amount of water leaking out of the bucket per unit time is preset proportional to a target bandwidth and, when the water level of the bucket comes below than a preset threshold value, a buffer memory associated with the leaky bucket is given the right of transmission of frames. Each time a frame is sent out, the bucket water level is increased by an increment as much as the length of the sent frame. Thus, the amount of data transferred will fall within the range of the target bandwidth on an average.

In the prior art described in patent document 1, for each buffer memory (packet queue), a difference value between a level count value corresponding to the current leaky bucket water level and the threshold value which corresponds to a pre-specified minimum guaranteed bandwidth is stored. A packet queue from which a frame is output is selected so that a buffered packet (frame) is sent out in order from a buffer memory with the smallest difference value.

According to the above prior art, packets are output in order from a buffer memory that is the nearest to the minimum guaranteed bandwidth and, therefore, packet transfer can be performed in compliance with the minimum guaranteed bandwidth. Further, in calculation of a water level increment incidental to sending out of a packet, a variable increment value, which is increased according to decrease in the level count value indicating the current water level of the leaky bucket, can be used to increase stepwise a unit increment value by which the packet length is multiplied. By adopting the variable increment value, when a packet is sent out in a state that the level count value is greatly lower than the threshold value, the increase of the bucket water level can be accelerated for a quick return to a higher level than the threshold value.

In the above prior art, by setting two threshold values for the minimum guaranteed bandwidth and the maximum allowed bandwidth on the level counter, the level count value can be controlled not to fall outside the thresholds. Accordingly, sending out amount of packets exceeding the maximum allowed bandwidth does not occur in normal condition. However, if the level count value becomes greatly lower than the threshold value because of traffic disruption, temporarily sending out packets more than the maximum allowed bandwidth is possible to occur until the level count value returns to a level higher than the threshold value of the minimum guaranteed bandwidth, as will be described below.

Figure 9A:
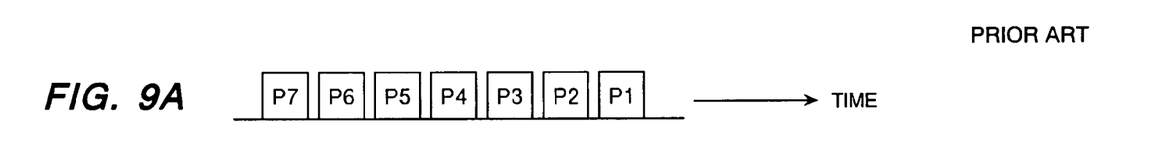
FIGS. 9A through 9C are a set of charts to explain a problem in prior-art bandwidth control of a leaky bucket type.
Figure 9B:
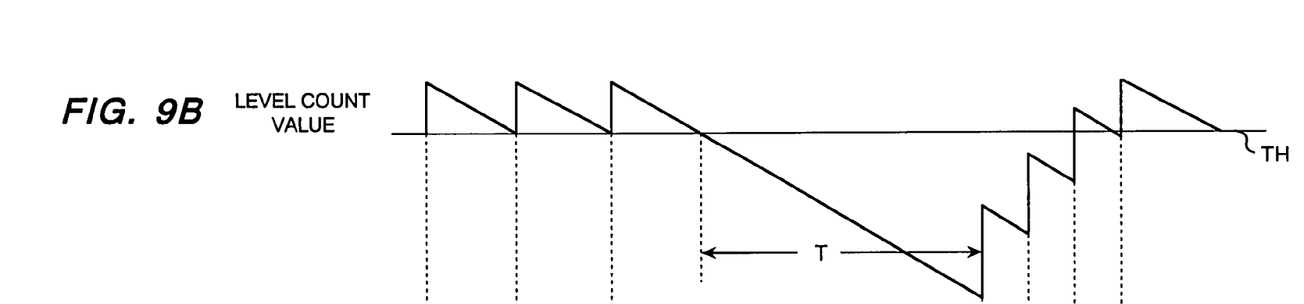
Figure 9C:
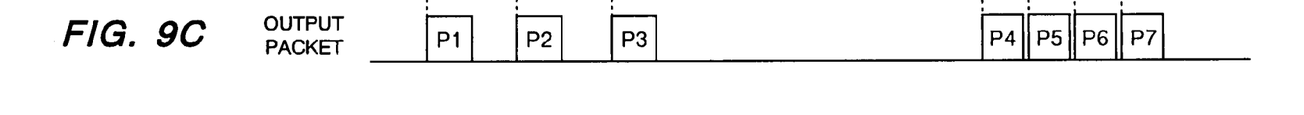

FIG. 9A shows the order in which packets belonging to the same flow arrive. FIG. 9B shows the level count value of a leaky bucket. FIG. 9C shows timing at which each packet (frame) is output.

The level count value of the leaky bucket decreases at a rate in proportion to the target bandwidth as time elapses, as shown in FIG. 9B. Each time a packet is output, a value in accordance with the output packet length is added to the level count value. When the level count value becomes less than the threshold value TH, a packet can be output if an output line is in an idle state. In normal condition, by sending packets (P1, P2, P3) whenever the level count value has come to the threshold value TH, traffic shaping can be performed in compliance with the target bandwidth. However, for instance, in a situation where no packet to be sent exists because of disruption of packet arrival for a while or where the output line blocked state continues because of sending packets belonging to another flow (connection), the level count value will be greatly lower than the threshold value TH as shown a period denoted by T.

In the event that a great decrease in the level count value occurs, even by sending out a packet and adding the packet length to the level count value, the level count value cannot be returned to a level higher than the threshold value and the condition for outputting packets remains satisfied. In this case, burst transmission of a plurality of packets belonging to the same flow occurs, as denoted by P4, P5, P6, P7, and packet transfer that temporarily exceeds the maximum allowed bandwidth is possible to occur until the level count value increases to a level sufficiently higher than the threshold value again.

SUMMARY OF THE INVENTION

It is an object of the present invention to provide a traffic shaping apparatus, a flow control method, and a communication node that ensure the minimum guaranteed bandwidth for each flow and can make effective use of free bandwidth of an output line within the maximum allowed bandwidth.

It is another object of the present invention to provide a traffic shaping apparatus, a flow control method, and a communication node that allow for burst transfer of packets without exceeding the maximum allowed bandwidth, even if another traffic competing on the same channel has decreased.

To achieve the above objects, a shaping apparatus and a communication node according to the present invention include a plurality of flow control units each for buffering variable length frames (packets) belonging to an individual flow and determining a timing to output each of buffered frames in accordance with a maximum allowed bandwidth and a minimum guaranteed bandwidth having been preset, a read control unit connected to the plurality of flow control units, and a frame distribution unit for discriminating flows to which variable length frames to be output to an output line belong and selectively distributing each of the variable length frames to any of the flow control units allocated for the flow.

Each of the flow control units includes a first frame output timing determination unit which issues a first frame output request for a maximum allowed bandwidth frame to the read control unit at a frame output timing determined based on the maximum allowed bandwidth preset for each flow, a second frame output timing determination unit which determines a frame output timing based on the minimum guaranteed bandwidth preset for each flow, and issues a second frame output request for a minimum guaranteed bandwidth frame to the read control unit under the condition that the first frame output request for a maximum allowed bandwidth frame is being issued from the first frame output timing determination unit, and a frame output controller for activating outputting one variable length frame to an output line interface in response to output permission received from the read control unit. The read control unit grants the output permission to one of the flow control units selected by a predetermined algorithm out of flow control units that are issuing the first or second frame output request.

More specifically, each flow control unit further includes a buffer memory for buffering variable length frames, and a frame length discriminator for detecting the length of a variable length frame output from the buffer memory. In this case, the first frame output timing determination unit determines the timing to output a next frame based on the maximum allowed bandwidth preset for each flow and the output frame length notified from the frame length discriminator. The second frame output timing determination unit determines a timing to output a next frame based on the minimum guaranteed bandwidth preset for each flow and the output frame length notified from the frame length discriminator.

In one embodiment of the present invention, the first frame output timing determination unit has a leaky bucket based counter structure which decrements a level count value at a decrescent rate in proportion to the maximum-allowed bandwidth preset for each flow, each time a frame is output by the frame output controller, raises the level count value in accordance with the length of the output frame, and compares the level count value with a predetermined threshold value to determine the frame output timing. Also, the second frame output timing determination unit has a leaky bucket based counter structure which decrements a level count value at a decrescent rate in proportion to the minimum guaranteed bandwidth preset for each flow, each time a frame is output by the frame output controller, raises the level count value in accordance with the length of the output frame, and compares the level count value with a predetermined threshold value to determine the frame output timing.

One feature of the present invention resides in that the first frame output timing determination unit fixes the lower limit of the level count value to the threshold value, and that the second frame output timing determination unit permits decrement of the level count value less than the threshold value.

Another feature of the present invention resides in that the read control unit includes a first output candidate determination unit for selecting a first flow control unit as a candidate for frame output execution out of a plurality of flow control units that are issuing the first frame output request for a minimum guaranteed bandwidth frame, a second output candidate determination unit for selecting a second flow control unit as a candidate for frame output execution out of a plurality of flow control units that are issuing the second frame output request for a maximum allowed bandwidth frame, and an output permission generator which grants the frame output permission to one of the first and second flow control units determined as the candidates for frame output execution, giving priority to the first flow control unit.

According to the present invention, a flow control method for a communication node having a plurality of input and output ports corresponding to a plurality of input and output lines, respectively, is comprised of the steps of: (A) switching variable length frames, received over each of said input lines and input to each of said input ports, to any one of said output ports specified by destination information of the received frames; (B) buffering variable length frames switched to each of said output ports on a flow-by-flow basis for different flows to which the frames belong; (C) determining a frame output timing based on a maximum allowed bandwidth having been preset for each flow, and issuing a first frame output request for a maximum allowed bandwidth frame; (D) determining a frame output timing based on a minimum guaranteed bandwidth having been preset for each flow, and issuing a second frame output request for a minimum guaranteed bandwidth frame, provided that the first frame output request for a maximum allowed bandwidth frame is being issued; and (E) selecting one of a plurality of frame output requests being issued, giving priority to the second frame output request for the minimum guaranteed bandwidth frame, and sending out the earliest buffered frame belonging to a flow that is the object of the frame output request to one of said output lines.

According to the present invention, because of that, for each flow, a first frame output request based on the maximum allowed bandwidth is issued from the first frame output timing determination unit and a second frame output request based on the minimum guaranteed bandwidth is issued from the second frame output timing determination unit under the condition that the first frame output request is being issued, and the read control unit determines a flow for which frame output should be executed, giving priority to the second frame output request based on the minimum guaranteed bandwidth, it is able to implement flow control ensuring the minimum guaranteed bandwidth of each flow and making effective use of free bandwidth of each output line.

Further, by fixing the level count lower limit that decides on the timing to generate the first frame output request based on the maximum allowed bandwidth to the threshold value, continuous issuance of frame output requests due to level count decrement lower than the threshold can be inhibited even in a situation, for instance, where arrival of subsequent frames in the same flow is disrupted for a while or where the output line remains blocked by transmission of frames in another flow. Thus, it is possible to prevent excess of maximum allowed bandwidth in burst transfer of frames in the same flow utilizing free bandwidth of an output line.

DETAILED DESCRIPTION OF THE PREFERRED EMBODIMENTS

Illustrative embodiments of the present invention will be described hereinafter with reference to the accompanying drawings.

Figure 1:
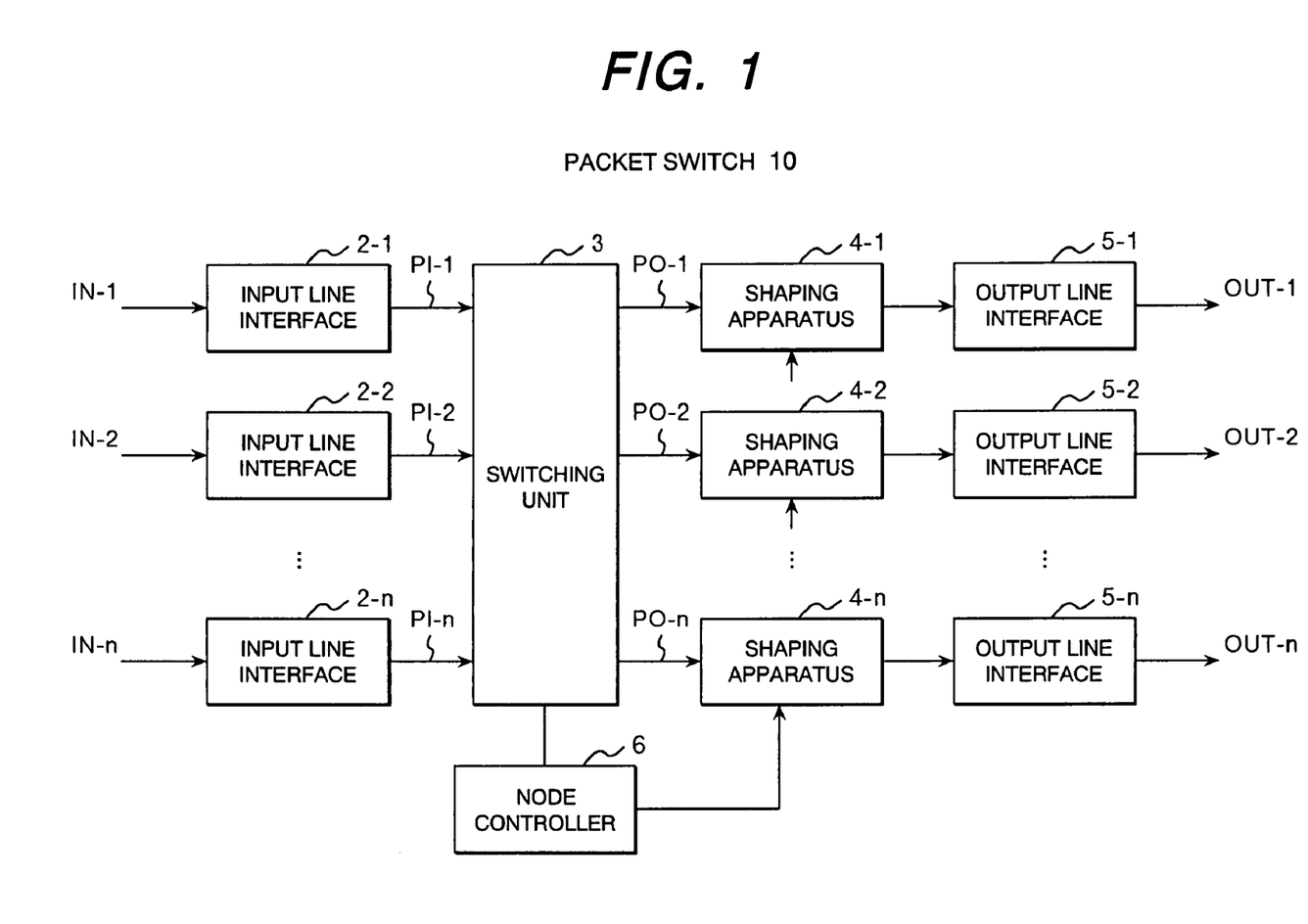
FIG. 1 shows an illustrative configuration of a packet switch 10 to which the present invention is applied.

FIG. 1 shows an example of a packet switch 10 to which shaping apparatuses according to the present invention are applied.

The packet switch 10 is comprised of a switching unit (frame relay processing unit) 3 having a plurality of input ports PI-1 to PI-n and a plurality of output ports PO-1 to PO-n, a plurality of input line interfaces 2-i (where i=1 to n; the same shall apply hereinafter) each connected between the input ports PI-i of the switching unit 3 and input lines IN-i, a plurality of shaping apparatuses (shapers) 4-i each connected to the output ports PO-i of the switching unit 3, a plurality of output line interfaces 5-i each connected between the shaping apparatuses 4-i and output lines OUT-i, and a node controller 6. The node controller 6 is connected to an external administrative terminal (not shown) and performs setting data in flow tables to be used by the shaping devices 4 and setting arithmetic parameters for bandwidth control according to instructions entered from the administrative terminal.

Each input line interface 2-i retrieves, when it receives a variable length frame (packet) from an input line IN-i, internal routing information from a routing table based on a destination address specified in the packet header, and outputs the received frame attached with an internal header including the internal routing information to the corresponding input port PI-i of the switching unit 3. The switching unit 3 transfers the variable length frame received through the input port PI-i to one of output ports specified by the internal routing information.

Each shaping apparatus 4-i stores temporarily the variable length frame output from the switching unit 3 to an output port PO-i, controls bandwidth for each flow based on a minimum guaranteed bandwidth and a maximum allowed bandwidth having been set in advance, and outputs the frame to the corresponding output line interface 5-i. Each output line interface 5-i removes the internal header from the frame output from the shaping apparatus 4-i and transmits the frame to the corresponding output line OUT-i.

Figure 2:
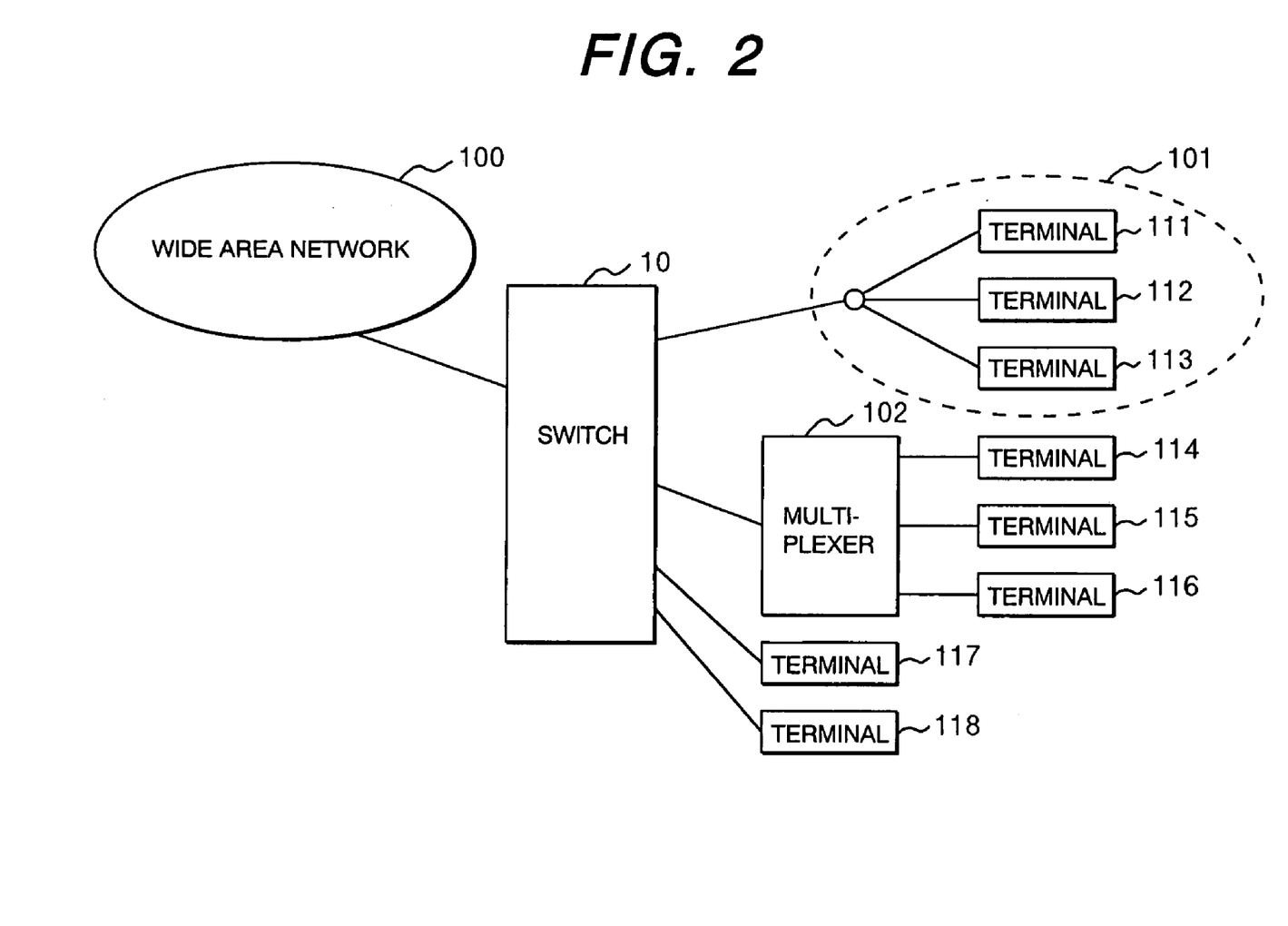
FIG. 2 shows an illustrative configuration of a network in which the packet switch 10 of the present invention is applied.

FIG. 2 shows an example of a network in which the packet switch 10 is applied.

Here, the packet switch 10 is located between a plurality of terminals 111 to 118 and a wide area network 100. Among the input and output lines IN-i and OUT-i of the packet switch 10, some lines accommodate individual terminals like terminals 117 and 118, some lines accommodate a passive network 101 including a plurality of terminals like terminals 111 to 113, and some lines accommodate a multiplexer 102 which actively allocates traffic to a plurality of terminals like terminals 114 to 116. In such a network configuration, in order to carry out flow control based on pre-specified bandwidths for each terminal, it is necessary for the packet switch 10 to buffer a plurality of sequences of packets routed to an output line, to which, e.g., the network 101 or the multiplexer 102 is connected, on a flow-by-flow basis and perform flow control ensuring the minimum guaranteed bandwidth and the maximum allowed bandwidth for each packet flow.

Figure 3:
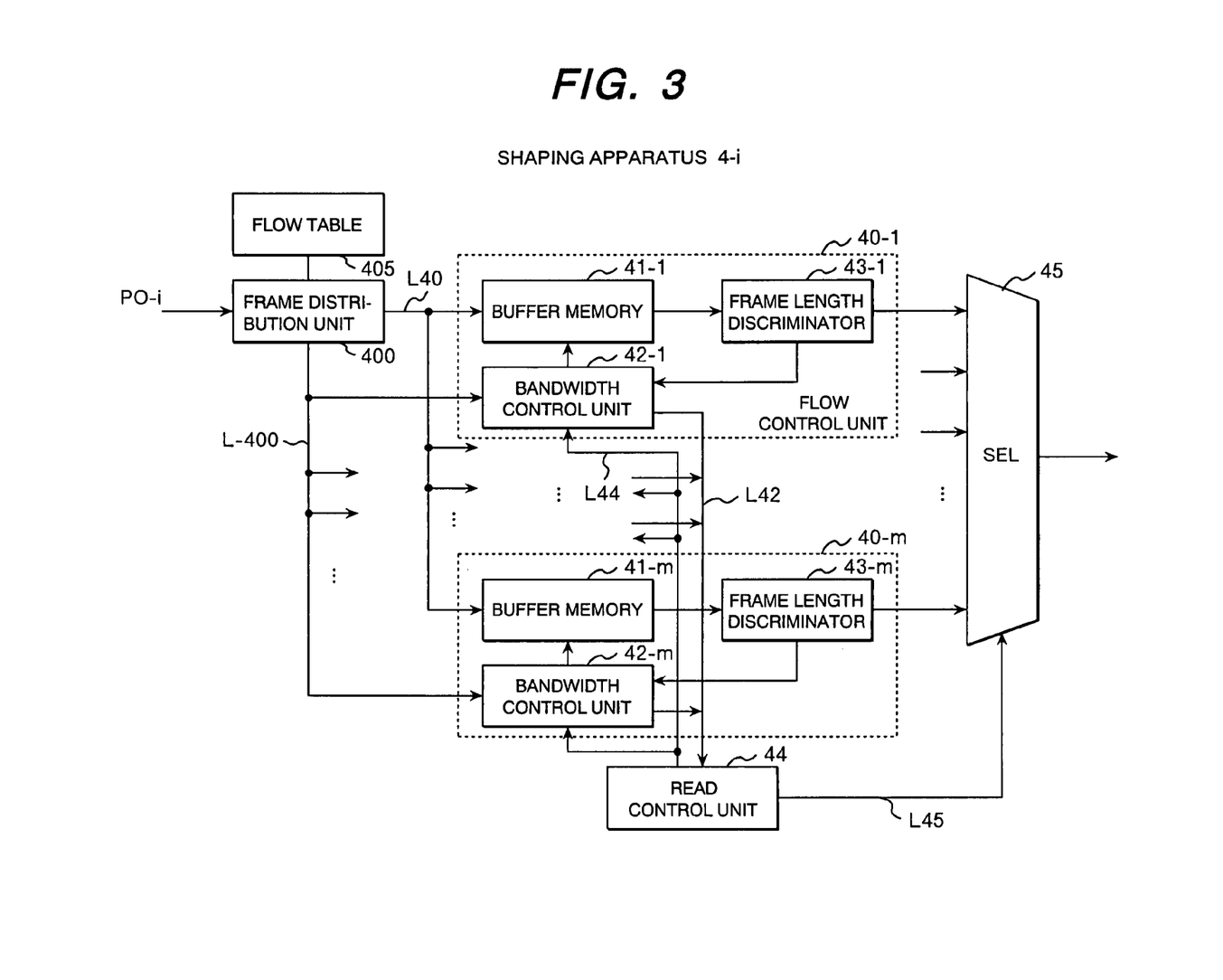
FIG. 3 shows a first embodiment of a shaping apparatus 4-i of the present invention applied to the packet switch 10.

FIG. 3 shows a first embodiment of a shaping apparatus 4-i of the present invention to be connected to an output port PO-i of the switching unit 3.

The shaping apparatus 4-i is comprised of a frame distribution unit 400 connected to the output port PO-i of the switching unit 3, a plurality of flow control units 40 (40-1 to 40-m) connected to the frame distribution unit 400, a read control unit 44 and a selector 45 each connected to these flow control units 40.

Each of the flow control units 40 includes a buffer memory 41 (41-1 to 41-m) for temporarily storing output frames (packets) each belonging to one of flows on the flow-by-flow basis, a bandwidth control unit 42 (42-1 to 42-m) associated with the buffer memory, and a frame length discriminator 43 (43-1 to 43-m) which detects the length of a frame read out from the buffer memory and notifies the bandwidth control unit 42 of the frame length.

An output frames transferred to the output port PO-i through the switching unit 3 is supplied to the flow distribution unit 400 which identifies a flow to which the output frame belongs and distributes the output frame to one of the buffer memories 41-j corresponding to the flow via a signal line L40. Identifying the flow to which the output frame belongs and specifying the buffer memory in which the frame should be stored are performed by referring to a flow table 405 for indicating the correspondence of flow definitions to buffer numbers. A packet flow is defined by a combination of header (label) information items such as, e.g., a destination address, tag information, priority, frame length, and service type extracted from the header of each output frame. When the frame distribution unit 400 outputs a variable length frame to one of the buffer memories 41-j through the signal line L40, it notifies the bandwidth control unit 42-j associated with the buffer memory 41-j that a packet has been input to the buffer memory 41-j.

According to the minimum guaranteed bandwidth and the maximum allowed bandwidth which have been set in advance for each flow, the bandwidth control unit 42-j determines a timing to output a packet from the buffer memory 41-j and issues a frame output request to the read control unit 44 through a signal line L42. In the present invention, as the frame output request, a frame output request in accordance with the minimum guaranteed bandwidth and a frame output request in accordance with the maximum allowed bandwidth are issued, as will be discussed later. For simplification purposes, the connection for the frame output request signal between each of the bandwidth control units 42-1 to 42-m and the read control unit 44 is represented as a single signal line L42.

The read control unit 44 watches for a frame output request output from any of the bandwidth control units 42-1 to 42-m to the signal line L42 and determines the bandwidth control unit that should be permitted for frame output execution. If a plurality of output requests conflict, the read control unit 44 selects one bandwidth control unit 42-k that should execute frame output preferentially, according to an output candidate determination algorithm having been prepared in advance, and sends an output permission signal to the bandwidth control unit 42-k through a signal line L44 when the corresponding output line interface 5-i has become ready for receiving a new frame. At this time, the read control unit 44 gives a selection control signal to the selector 45 through a signal line L45 so that an output frame from the frame length discriminator 43-k associated with the bandwidth control unit 42-k will be output to the output line interface 5-i.

In response to the frame output permission signal from the read control unit 44, the bandwidth control unit 42-k makes the buffer memory 41-k output a buffered output frame and updates the level of a leaky bucket, with which the next output timing is determined based on the minimum guaranteed bandwidth and the maximum allowed bandwidth, according to the frame length notified from the frame length discriminator 43-k.

Figure 4:
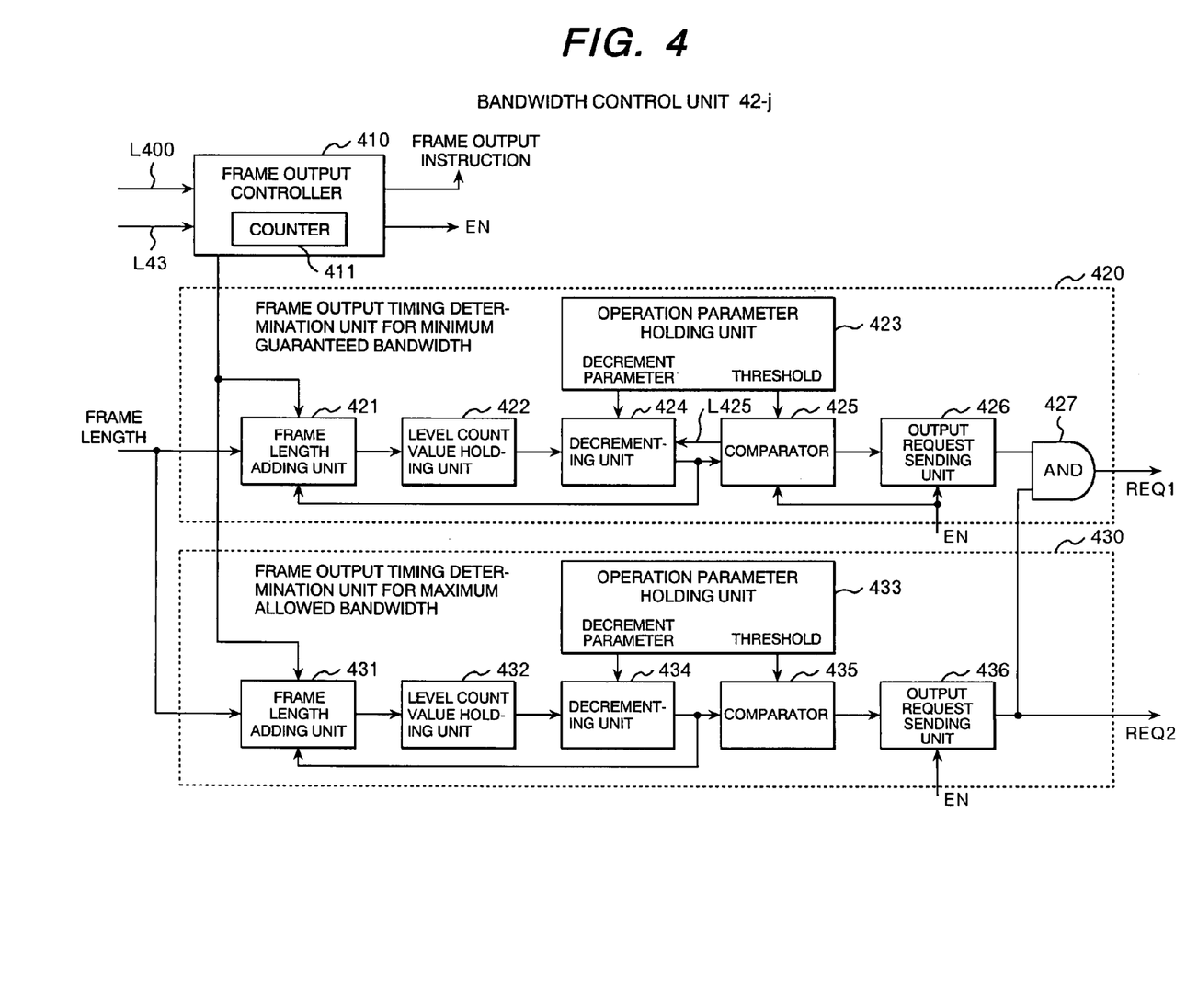
FIG. 4 shows an embodiment of a bandwidth control unit 42 which is a constituent of the shaping apparatus of the present invention.

FIG. 4 shows one embodiment of a bandwidth control unit 42-j (where j=1 to m) to be applied to the shaping apparatus 4-i of FIG. 3.

The bandwidth control unit 42-j is comprised of a frame output controller 410, a frame output timing determination unit for minimum guaranteed bandwidth 420 which generates a frame output request signal REQ1 based on the minimum guaranteed bandwidth, and a frame output timing determination unit for maximum allowed bandwidth 430 which generates a frame output request signal REQ2 based on the maximum allowed bandwidth.

The frame output controller 410 has a counter 411 for counting the number of packets buffered in the buffer memory 41-j and increments the counter 411 when it receives a notification of a packet input from the frame distribution unit 400 through a signal line L400. Upon receiving a frame output permission signal from the read control unit 44, the frame output controller 410 outputs a frame output instruction to the buffer memory 41-j, decrements the counter 411, and outputs an add frame length instruction to the frame output timing determination unit for minimum guaranteed bandwidth 420 and the frame output timing determination unit for maximum allowed bandwidth 430. When the count value of the counter 411 is "1" or more, that is, at least one frame exists in the buffer memory 41-j, the frame output controller 410 sets an enable signal EN on, which is given to the frame output timing determination unit for minimum guaranteed bandwidth 420 and the frame output timing determination unit for maximum allowed bandwidth 430, and turns the signal EN off when the count value has become zero.

The frame output timing determination unit for minimum guaranteed bandwidth 420 is comprised of a frame length adding unit 421, a level count value holding unit 422 for retaining the level count value updated by the frame length adding unit 421, an operation parameter holding unit 423 which stores preset arithmetic parameters, a decrementing unit 424 for periodically decrementing the level value provided from the level count value holding unit 422 by a decrement parameter value stored as one of the arithmetic parameters in the operation parameter holding unit 423, a comparator 425 for comparing the level count value output from the decrementing unit 424 with a threshold value stored as one of the arithmetic parameters in the operation parameter holding unit 423, and outputting a comparison result, an output request sending unit 426 for generating a frame output request signal upon detecting, from the output of the comparator 425, that the level count value has become less than the threshold value, and a logical product (AND) circuit 427 for outputting, as a frame output request signal REQ1 for minimum guaranteed bandwidth, a logical product of a frame output request signal from the output request sending unit 426 and a frame output request signal output from the frame output timing determination unit for maximum allowed bandwidth 430.

The output request sending unit 426 does not generate a frame output request signal when the enable signal EN is off. When the enable signal EN has changed from on to off, the comparator 425 instructs the decrementing unit 424 via a signal line L425 to stop decrement operation when the level count value has come to the threshold. The operation of decrementing the level count value by the decrementing unit 424 resumes when a next packet is input to the buffer memory 41-j and the enable signal EN has changed from off to on.

On the other hand, the frame output timing determination unit for maximum allowed bandwidth 430 is comprised of a frame length adding unit 431, a level count value holding unit 432, an operation parameter holding unit 433 for storing preset arithmetic parameters, a decrementing unit 434 for periodically decrementing the level value provided from the level count value holding unit 432 by a decrement parameter value stored as one of the arithmetic parameters in the operation parameter holding unit 433, a comparator 435 for comparing the level count value output from the decrementing unit 434 with a threshold value stored as one of the arithmetic parameters in the operation parameter holding unit 433, and outputting a comparison result, an output request sending unit 436 for generating a frame output request signal REQ2 when the output of the comparator 435 has come to the threshold. The decrementing unit 434 actually stops the decrement operation when the level count value has come to the threshold and keeps the count value at the threshold. The output request sending unit 436 does not generate a frame output request signal when the enable signal EN is off.

The frame output timing determination unit for maximum allowed bandwidth 430 is similar in structure to the frame output timing determination unit for minimum guaranteed bandwidth 420, except that it does not have the logical circuit 427. The lower limit of the level count value output from the decrementing unit 434 is equal to the threshold value, and the parameter values stored in the operation parameter holding unit 433 differ from those stored in the corresponding unit in the frame output timing determination unit for minimum guaranteed bandwidth 420. Therefore, detailed operation will be described below on the frame output timing determination unit for minimum guaranteed bandwidth 420.

The current level count value output from the decrementing unit 424 is input to the frame length adding unit 421. Upon receiving the add frame length instruction from the frame output controller 410, the frame length adding unit 421 adds the output frame length received from the frame length discriminator 43-j to the current level count value. If there is no add frame length instruction, addition of the output frame length to the count value is not executed and, thus, the current level count value output from the decrementing unit 424 is input as it is to the level count value holding unit 422.

The decrementing unit 424 periodically subtracts the decrement parameter value provided by the operation parameter holding unit 423 from the level count value provided by the level count value holding unit 422 and outputs the decrement result as a new level count value to the frame length adding unit 421 and the comparator 425. The parameter value is proper for the minimum bandwidth to be guaranteed in the case of the frame output timing determination unit for minimum guaranteed bandwidth 420 and the maximum bandwidth allowable in the case of the frame output timing determination unit for maximum allowed bandwidth 430. Therefore, in the frame output timing determination unit for minimum guaranteed bandwidth 420, the output of the decrementing unit 424 represents the water level of the leaky bucket which decreases gradually at a rate in proportion to the minimum guaranteed bandwidth and increases at every frame output in accordance with the output frame length.

The comparator 425 outputs the result of comparison between the level count value (leaky bucket water level) output from the decrementing unit 424 and the threshold value provided by the operation parameter holding unit 423. If the level count value is less than the threshold value, the frame output request signal is issued from the output request sending unit 426.

In the present embodiment, the frame output timing determination unit for minimum guaranteed bandwidth 420 includes the logical product (AND) circuit 427 in the last stage, where the logical product of the output signal from the output request sending unit 426 and the frame output request signal REQ2 output from the output request sending unit 436 in the frame output timing determination unit for maximum allowed bandwidth 430 is output as the frame output request signal REQ1. Therefore, unless a frame output request is generated from the frame output timing determination unit for maximum allowed bandwidth 430, a frame output request for minimum guaranteed bandwidth is not generated.

Figure 5:
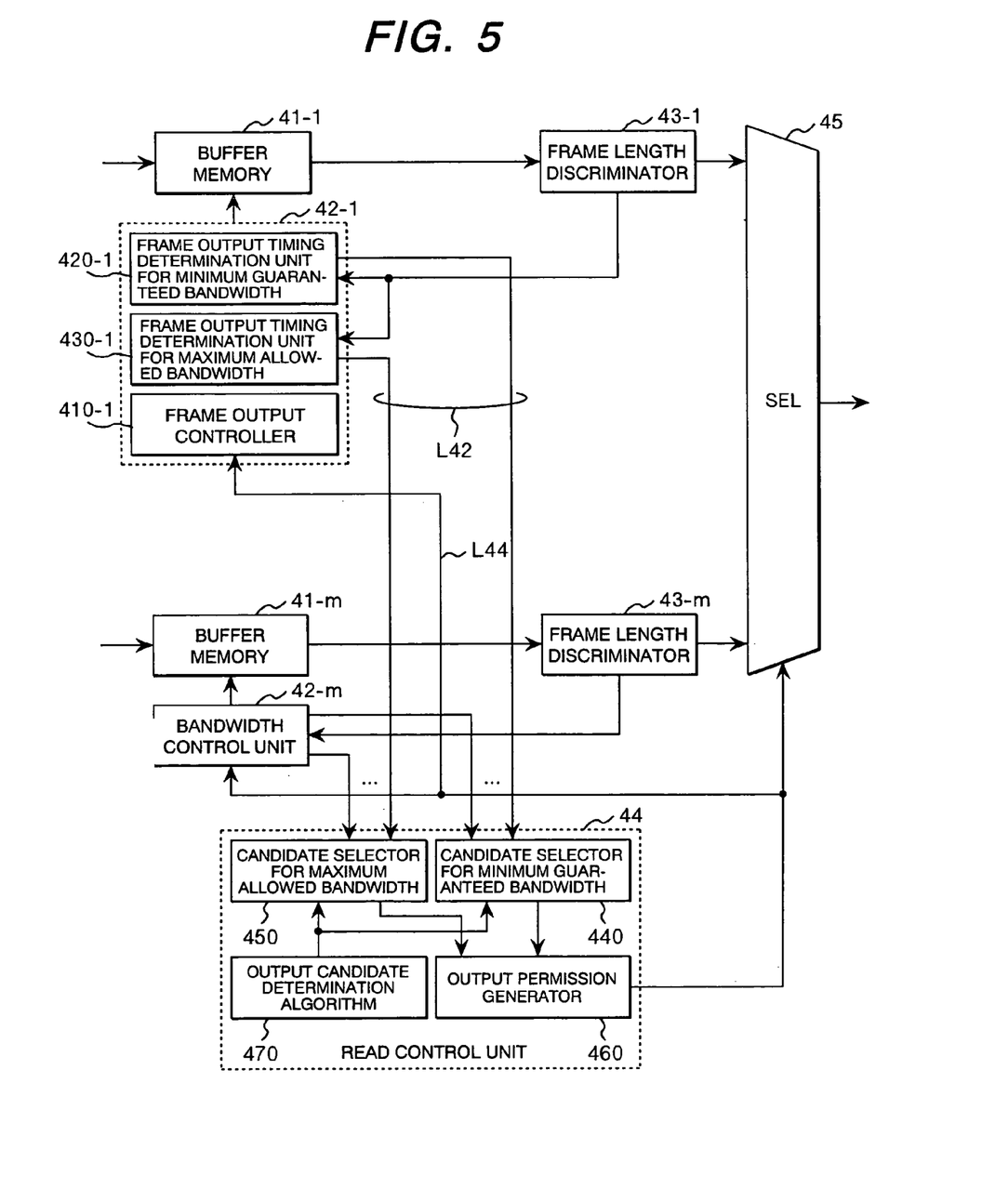
FIG. 5 shows an embodiment of a read control unit 44 which is a constituent of the shaping apparatus of the present invention.

FIG. 5 shows an embodiment of the read control unit 44. Since each bandwidth control unit 42 (42-1 to 42-m) includes the frame output timing determination unit for minimum guaranteed bandwidth 420 and the frame output timing determination unit for maximum allowed bandwidth 430, as described above, two types of requests are input from each bandwidth control unit 42 to the read control unit 44. That is, the read control unit receives the frame output request signal REQ1 generated based on the minimum guaranteed bandwidth and the frame output request signal REQ2 generated based on the maximum allowed bandwidth.

The read control unit 44 is comprised of a candidate selector for minimum guaranteed bandwidth 440 for processing the frame output request signal REQ1, a candidate selector for maximum allowed bandwidth 450 which processes the frame output request signal REQ2, an output permission generator 460, and an output candidate determination algorithm storing unit 470.

The candidate selector for minimum guaranteed bandwidth 440 selects, as a candidate for frame output execution, one of the bandwidth control units each of which is generating the frame output request signal REQ1, according to the output candidate determination algorithm present in the storing unit 470. Likewise, the candidate selector for maximum allowed bandwidth 450 selects, as a candidate for frame output execution, one of the bandwidth control units each of which is generating the frame output request signal REQ2, according to the above output candidate determination algorithm. However, the output candidate determination algorithm of the candidate selector for minimum guaranteed bandwidth 440 may be different from that of the candidate selector for maximum allowed bandwidth 450.

The output permission generator 460 gives priority to the candidate for output execution of a minimum guaranteed bandwidth frame over the candidate for output execution of a maximum allowed bandwidth frame. Therefore, when the frame output request REQ1 for a minimum guaranteed bandwidth frame is being issued, a bandwidth control unit selected as the candidate for minimum guaranteed bandwidth frame output execution is granted the output permission. If there is no candidate for minimum guaranteed bandwidth frame output execution, a bandwidth control unit selected as the candidate for maximum allowed bandwidth frame output execution is granted the output permission. If there is neither candidate for minimum guaranteed bandwidth frame output execution nor candidate for maximum allowed bandwidth frame output execution, it means that there is no buffer memory from which a frame should be output at the present and any frame output permission is not issued.

Figures 6A, 6B:
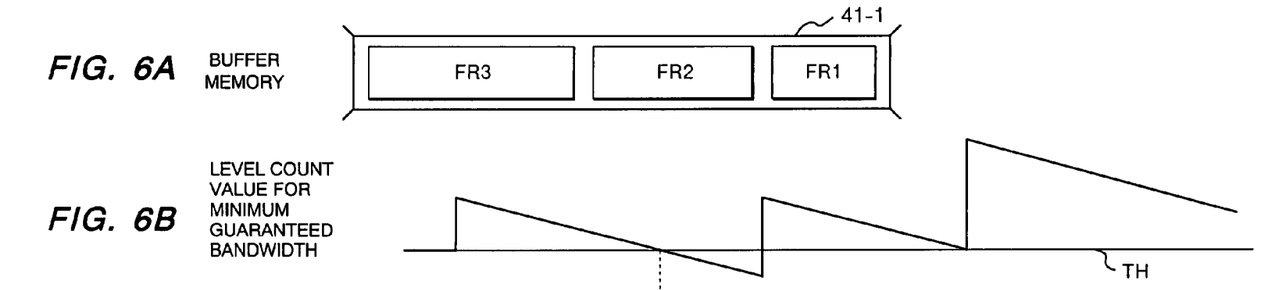
FIGS. 6A through 6F are a set of charts to explain how variable length frames are output from a buffer memory 41-1 under the control of a bandwidth control unit 42-1 in the shaping apparatus of the present invention.

FIGS. 6A through 6F show how variable length frames (packets) are output from a buffer memory 41-1 under the control of the bandwidth control unit 42-1 in the above-described shaping apparatus 4 of the present invention. Here, assume that frames have been input to the buffer memory 41-1 in order of FR1, FR2, and FR3, as shown in FIG. 6A.

Figure 6C:
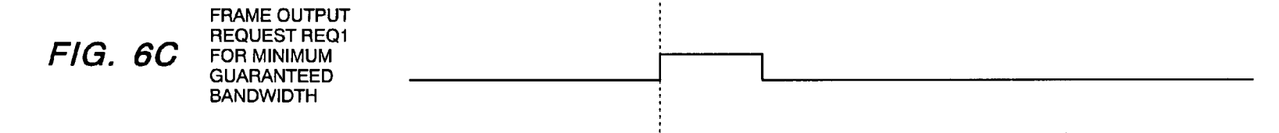
Figure 6D:
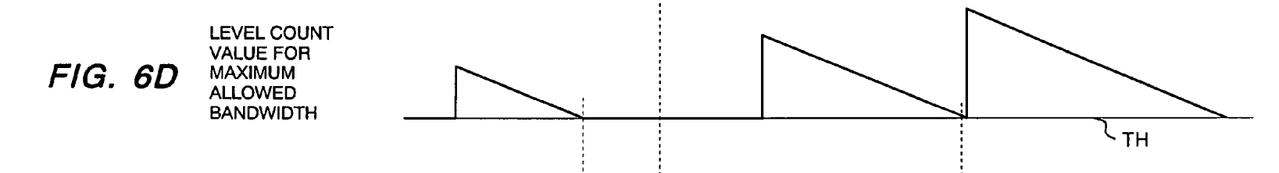
Figure 6E:
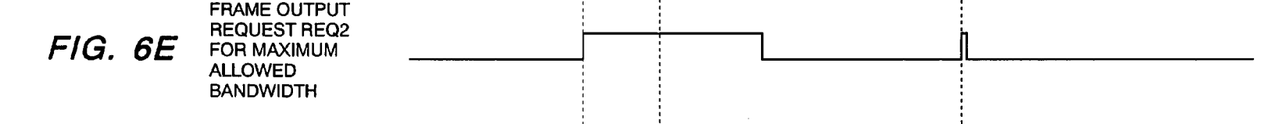
Figure 6F:
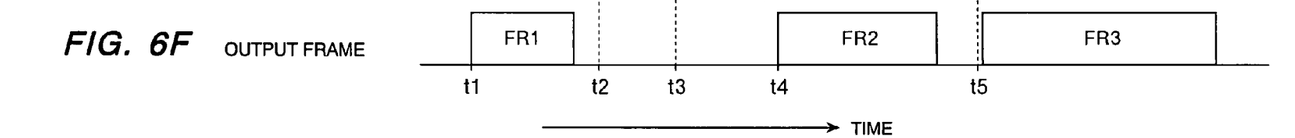

FIG. 6B shows the level count value output from the decrementing unit 424 in the frame output timing determination unit for minimum guaranteed bandwidth 420 associated with the buffer memory 41-1. FIG. 6C shows the frame output request signal REQ1 for a minimum guaranteed bandwidth frame, which is generated from the logical production circuit 427 in the frame output timing determination unit for minimum guaranteed bandwidth 420. FIG. 6D shows the level count value output from the decrementing unit 434 in the frame output timing determination unit for maximum allowed bandwidth 430 associated with the buffer memory 41-1. FIG. 6E shows the frame output request signal REQ2 for a maximum allowed bandwidth frame, which is generated from the output request sending unit 436 in the frame output timing determination unit for maximum allowed bandwidth 430. FIG. 6F shows timing at which each frame FR1, FR2, FR3 is output from the buffer memory 41-1.

The bandwidth control unit 42-1 receives output permission from the read control unit 44 and starts output operation of frame FR1 at time t1, as shown in FIG. 6F. At this time, each of the frame length adding units 421 and 431 adds the length of the frame FR1 to the level count value for minimum guaranteed bandwidth and the level count value for maximum allowed bandwidth, respectively, thus, both the level count values rise, as shown in FIGS. 6B and 6D. Here, because the same frame length is added to the level count values, both the level count values for minimum guaranteed bandwidth and maximum allowed bandwidth are high at the same level in the initial state t1. Both the level count values gradually decrease over time by the decrement operations by the decrementing units 424 and 434. However, because a greater decrement value is given to the decrementing unit 434 for maximum allowed bandwidth, the level count value for maximum allowed bandwidth falls more steeply than that for minimum guaranteed bandwidth.

When the level count value for maximum allowed bandwidth has come to the threshold (zero) TH at time t2, the frame output request signal REQ2 for a maximum allowed bandwidth frame is turned on, as shown in FIG. 6E. At this time, the decrementing unit 434 actually suspends the level count decrement operation and keeps the level count value at the threshold. In consequence of that the frame output request signal REQ2 is generated, after time t2, the buffer memory 41-1 becomes the candidate for maximum allowed bandwidth frame output execution and ready for outputting a frame by output permission from the read control unit 44.

When the level count value of the decrementing unit 424 has come to the threshold TH at time t3 while no output permission is obtained, the frame output request signal REQ1 for a minimum guaranteed bandwidth frame is turned on, as shown in FIG. 6C. The decrementing unit 424 for minimum guaranteed bandwidth continues decrement operation even after the count value becomes less than the threshold. After time t3, the buffer memory 41-1 is the candidate for minimum guaranteed bandwidth frame output execution as well as the candidate for maximum allowed bandwidth frame output execution.

When the bandwidth control unit 42-1 receives output permission from the read control unit 44 at time t4, it starts outputting the frame FR2 from the buffer memory 41-1 and adds the length of the frame FR2 to the level count value for minimum guaranteed bandwidth and the level count value for maximum allowed bandwidth. By this addition, both the level count values rise higher than the threshold and the frame output requests REQ1 and REQ2 are turned off.

The decrementing units 424 and 434 resumes decrement operation from the updated level count values. When the level count value of the decrementing unit 434 has come to the threshold (zero) at time t5, the frame output request signal REQ2 for a maximum allowed bandwidth frame is generated, as shown in FIG. 6E. Assuming here that there is no request from the other bandwidth control units at time t5, the bandwidth control unit 42-1 immediately obtains the next output permission and makes the buffer memory 41-1 output the frame FR3.

In association with the frame FR3 output, as the length of the frame FR3 is added to the level count value for minimum guaranteed bandwidth and the level count value for maximum allowed bandwidth, the frame output request REQ2 is turned off and level count decrement operation is repeated from the updated level. When the buffer memory 41-1 becomes empty, the enable signal EN from the frame output controller 410 is set off and, consequently, each of the output request sending units 426 and 436 will not generate a frame output request even if its level count value has come to the threshold.

As described above, according to the shaping apparatus of the present invention, as the read control unit 44 grants frame output permission to a bandwidth control unit determined as the candidate for maximum allowed bandwidth frame output execution during a period when there is no candidate for minimum guaranteed bandwidth frame output execution, packet (frame) transfer making effective use of free bandwidth of an output line is feasible.

Next, focusing on two buffer memories 41-1 and 41-2 in the shaping apparatus of the present invention, further explanation of frame output operation will be provided by referring to FIGS. 7A through 7G.

Figure 7A:
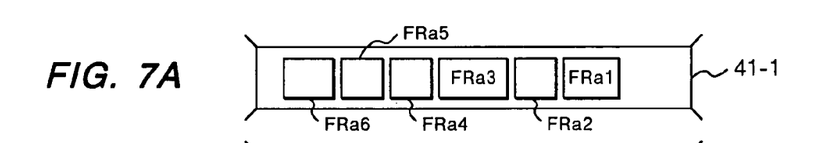
FIGS. 7A through 7G are a set of charts to explain how variable length frames are output from two buffer memories 41-1 and 41-2 in the shaping apparatus of the present invention.
Figure 7B:
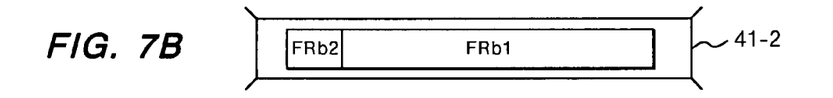

Here, assume that frames FRa1 to FRa6 have been input to the buffer memory 41-1, as shown in FIG. 7A, and frames FRb1 and FRb2 have been input to the buffer memory 41-2, as shown in FIG. 7B. To simplify explanation, assume that no frames are present in the remaining buffer memories 41-3 to 41-m and that the read control unit 44 uses a round-robin output candidate determination algorithm in which the bandwidth control units that are issuing a frame output request are granted in turn output permission.

Figures 7C, 7D:
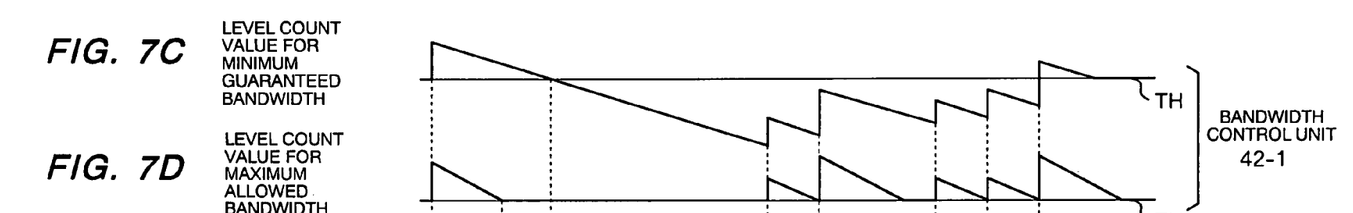
Figure 7E:
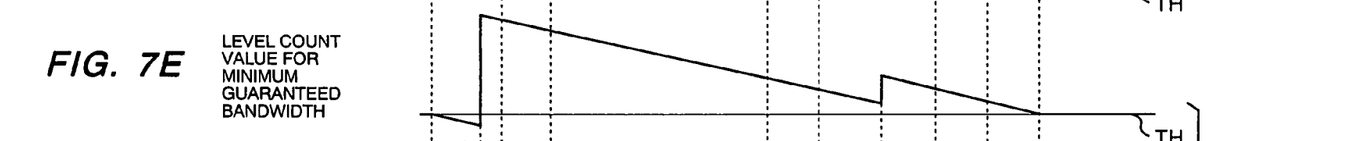
Figure 7F:
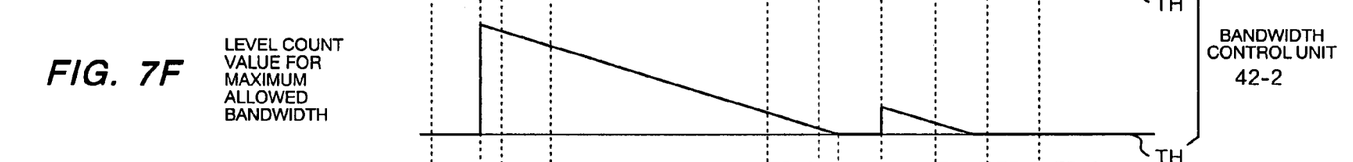
Figure 7G:
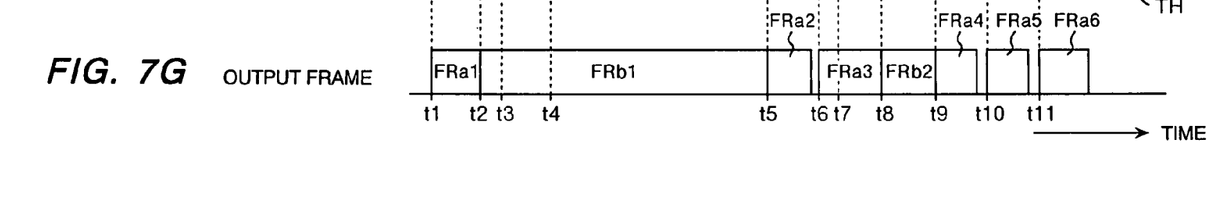

FIGS. 7C and 7D respectively show the level count value of the frame output timing determination unit for minimum guaranteed bandwidth 420 and the level count value of the frame output timing determination unit for maximum allowed bandwidth 430 in the bandwidth control unit 42-1 associated with the buffer memory 41-1. FIGS. 7E and 7F respectively show the level count value of the frame output timing determination unit for minimum guaranteed bandwidth 420 and the level count value of the frame output timing determination unit for maximum allowed bandwidth 430 in the bandwidth control unit 42-2 associated with the buffer memory 41-2. FIG. 7G shows timing at which each frame is output from the buffer memory 41-1 or the buffer memory 41-2.

When the read control unit 44 grants output permission to the bandwidth control unit 42-1 at time t1, the bandwidth control unit 42-1 starts output operation of frame FRa1 from the buffer memory 41-1, and add the frame length to the level count value for minimum guaranteed bandwidth and the level count value for maximum allowed bandwidth in the bandwidth control unit 42-1, as shown in FIGS. 7C and 7D.

When the output of the frame FRa1 to the output line interface 50-1 is completed at time t2, the read control unit 44 selects a buffer memory that should output a frame next. At this time, the bandwidth control unit 42-1 does not generate a frame output request, because both the level count values for minimum guaranteed bandwidth and maximum allowed bandwidth are higher than the threshold. On the other hand, the bandwidth control unit 42-2 is generating both frame output requests REQ1 and REQ2, because the level count value for minimum guaranteed bandwidth is less than the threshold and the level count value for maximum allowed bandwidth has come to the threshold as shown in FIGS. 7E and 7F. In consequence, frame output permission is granted to the bandwidth control unit 42-2 and output operation of frame FRb1 starts at time t2.

As shown in FIGS. 7C and 7D, the bandwidth control unit 42-1 generates a frame output request REQ2 at time t3 when the level count value for maximum allowed bandwidth has come to the threshold and generates a frame output request REQ1 at time t4 when the level count value for minimum guaranteed bandwidth has come to the threshold. However, because the bandwidth control unit 42-2 is sending out the frame FRb1 and the output line is blocked at time t3 and t4, frame output permission to the bandwidth control unit 42-1 is suspended until time t5 at which output of the frame FRb1 is completed.

During this wait time, as the bandwidth control unit 42-1 continues decrement operation of the level count value for minimum guaranteed bandwidth, the level count value becomes greatly lower than the threshold as shown in FIG. 7. The bandwidth control unit 42-1 obtains the output permission and starts output operation of a frame FRa2 from the buffer memory 41-1 at time t5. By adding the frame length in association with the output of the frame FRa2, the level count value rises in the bandwidth control unit 42-1, but the level count value for minimum guaranteed bandwidth is still lower than the threshold, as shown in FIG. 7C.

According to a bandwidth control method of prior art, in such a case where the level count value is lower than the threshold, a frame output request for a minimum guaranteed bandwidth frame is generated. Consequently, at the end of the output of the frame FRa2, if there is no frame output request from any other bandwidth control unit, the bandwidth control unit 42-1 is immediately granted permission for outputting the next frame. According to the preset invention, however, as the bandwidth control unit 42-1 includes the logical product circuit 427 in the frame output timing determination unit for minimum guaranteed bandwidth 420, the issuance of a frame output request REQ1 for a minimum guaranteed bandwidth frame is suppressed until a frame output request REQ2 for a maximum allowed bandwidth frame is generated, that is, until time t6 when the level count value for maximum allowed bandwidth has come to the threshold.

The bandwidth control unit 42-1 issues a frame output request REQ1 for a minimum guaranteed bandwidth frame and a frame output request REQ2 for a maximum allowed bandwidth frame together at time t6. In the example shown here, because both the level count values of the bandwidth control unit 42-2 for minimum guaranteed bandwidth and maximum allowed bandwidth are still higher than the threshold at time t6, as shown in FIGS. 7E and 7F, the read control unit 44 grants frame output permission to the bandwidth control unit 42-1. Thus, the bandwidth control unit 42-1 starts output operation of a frame FRa3 from the buffer memory 41-1 at time t6. In the period of sending the frame FRa3 to the output line, the bandwidth control unit 42-2 issues a frame output request REQ2 at time t7 when the level count value for maximum allowed bandwidth has come to the threshold as shown in FIGS. 7F and 7G.

When the output of the frame FRa3 is completed at time t8, because only the frame output request REQ2 for a maximum allowed bandwidth frame from the bandwidth control unit 42-2 is generated as output request, the read control unit 44 grants output permission to the bandwidth control unit 42-2. In consequence, output operation of a frame FRb2 from the buffer memory 41-2 starts at time t8. When the output of the frame FRb2 is completed at time t9, output permission is granted to the bandwidth control unit 42-1 which has been already generating frame output requests REQ1 and REQ2.

In the example shown here, because the buffer memory 41-2 becomes empty after outputting the frame FRb2, the bandwidth control unit 42-2 stops the level count decrement operation by the decrementing unit 424 when the level count value for minimum guaranteed bandwidth has come to the threshold. After the output of frame FRa4 terminates at time t9, only the bandwidth control unit 42-1 repeats the operation for outputting a frame, updating the level count value in association with frame output, generating a frame output request REQ2 when the level count value for maximum allowed bandwidth has come to the threshold, as shown in FIGS. 7C, 7D, and 7G. When the buffer memory 41-1 become empty, the bandwidth control unit 42-1 also stops the level count decrement operation by the decrementing unit 424 when the level count value for minimum guaranteed bandwidth has come to the threshold.

As is obvious from the output timing of frames FRa4, FRa5, and FRa6, according to the present invention, even in the case where a series of frames (packets) belonging to the same flow can be sent out at a burst, frame output permissions is granted to the bandwidth control unit in such a manner that a flow of output frames does not exceed the preset maximum allowed bandwidth. Therefore, even if the output line is in an idle state, packet transfer control is carried out so as to suppress a temporary excess of maximum allowed bandwidth in each flow.

Figure 8:
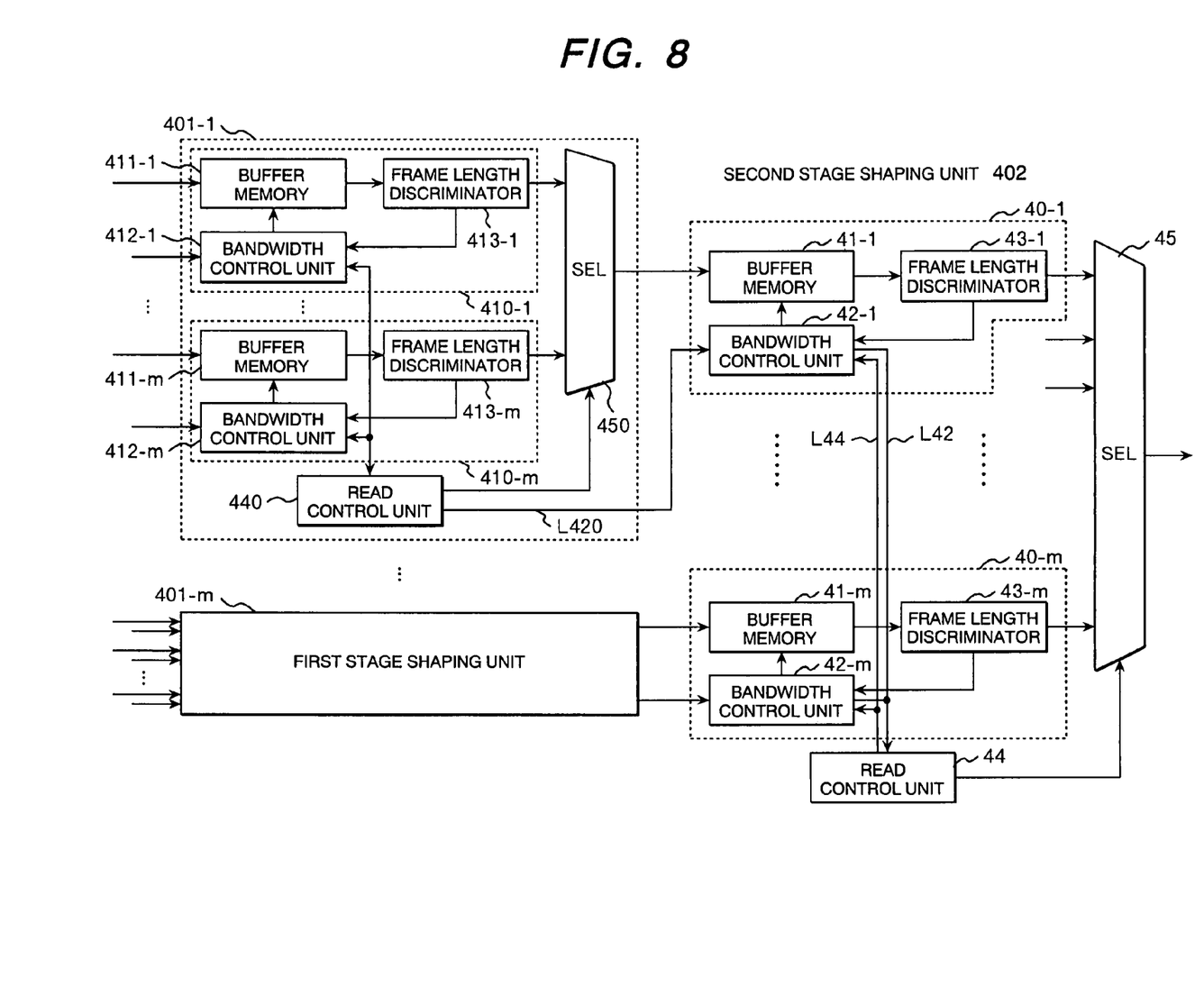
FIG. 8 shows a second embodiment of a shaping apparatus of the present invention.

FIG. 8 shows a second embodiment of a shaping apparatus according to the present invention.

The shaping apparatus shown in the second embodiment is comprised of a plurality of first stage shaping units 401 (401-1 to 401-m) prepared for each group and a second stage shaping unit 402 connected between these first stage shaping units and an output line interface. Output frames transferred through the switching unit 3 to an output port PO-i are distributed to the first shaping units appropriately by the frame distribution unit 400 shown in FIG. 3.

Each of the first stage shaping units 401 is comprised of a plurality of first flow control units 410 (410-1 to 410-k), each of which stores temporarily variable length frames each belonging to one of flows in the same group and determines timing to output each of the buffered frames in accordance with a maximum allowed bandwidth and a minimum guaranteed bandwidth which have been preset for each flow, a first read control unit 440 connected to these flow control units, and a selector 450. The first read control unit 440 has essentially the same structure as the read control unit 44 shown in FIG. 5. Each of the first flow control units 410 includes a buffer memory 411 (411-1 to 411-k), a bandwidth control unit 412 (412-1 to 412-k), and a frame length discriminator 413 (413-1 to 413-k).

On the other hand, the second stage shaping unit 402 is comprised of a plurality of second flow control units 40 (40-1 to 40-m), each of which stored temporarily variable length frames belonging to an individual group output from a first stage shaping unit 401 and determines timing to output each of the buffered frames in accordance with a maximum allowed bandwidth and a minimum guaranteed bandwidth which have been preset for each flow group, a second read control unit 44 which grants frame output permission to a flow control unit 40-j selected by a predetermined algorithm out of a plurality of second flow control units which are issuing a frame output request, and a selector 45.

The second read control unit 44 has the same structure as the read control unit 44 shown in FIG. 5. Each of the flow control units 40 in the second stage shaping unit includes a buffer memory 41 (41-1 to 41-m) to temporarily store frames output from one of the first stage shaping units 401-1 to 401-m, a bandwidth control unit 42 (42-1 to 42-m) and a frame length discriminator 43 (43-1 to 43-m) associated with the buffer memory 41. The bandwidth control units 42-1 to 42-m are connected to the second read control unit 44, and the frame length discriminators 43-1 to 43-m are connected to the selector 45.

In this embodiment, the frame distribution unit 400 connected to an output port PO-i classifies output frames into a plurality of groups according to label information items such as, e.g., a destination address, tags, priority, frame length, and service type extracted from the header of an output frame. Output frames belonging to a first flow group are distributed to buffer memories 411-1 to 411-k in the first stage shaping unit 401-1 corresponding to the first flow group, flow (connection) by flow. Likewise, output frames belonging to second through m-th flow groups are respectively distributed to the buffer memories 411-1 to 411-k in the first stage shaping units 401-2 to 401-m corresponding to their groups, flow by flow.

In each of the first stage shaping units 401-j (where j=1 to m), in the same way of operation as for the shaping apparatus described for FIG. 3, each bandwidth control unit 412 (412-1 to 412-k) issues a frame output request for a maximum allowed bandwidth frame and a frame output request for a minimum guaranteed bandwidth frame and outputs a variable length frame stored for each flow in the buffer memory 411 (411-1 to 411-k) to the selector 450, in response to an output permission signal from the read control unit 440. At this time, the output permission generator 460 of the read control unit 440 shown in FIG. 5 notifies, through a signal line L420, the corresponding bandwidth control unit 42 in the second stage shaping unit 402 that a new frame (packet) has been input.

In the same way as for the shaping apparatus described for FIG. 3, each of the bandwidth control units 42 (42-1 to 42-m) of the second stage shaping unit 402 issues a frame output request for a maximum allowed bandwidth frame and a frame output request for a minimum guaranteed bandwidth frame and, in response to an output permission signal from the read control unit 44, outputs a variable length frame stored for each flow group in the buffer memory 41 (41-1 to 41-m) to the corresponding output line interface via the selector 45.

In this embodiment, for instance, if 100 Mbps is set for the maximum allowed bandwidth of packet flows to be output from the buffer memories 411-1 to 411-k in the first stage shaping unit 401-1, and 100 Mbps is set for the maximum allowed bandwidth of a packet flow to be output from the buffer memory 41-1 in the second stage shaping unit 402 to which the output frames from the first stage shaping unit are input, the packet flows output from the buffer memories 411-1 to 411-k are bandwidth controlled within the maximum allowed bandwidth of 100 Mbps in terms of both individual flows and a group flow.

Therefore, for instance, in the case where k flows belonging to the same VLAN group are respectively allocated to the buffer memories 411 (411-1 to 411-k) in the first stage shaping unit 401-1 and a packet flow of the VLAN group to which these k flows are bundled is buffered into the buffer memory 41-1, flow control can be performed to allow the maximum bandwidth of 100 Mbps for each individual flow, while restricting the VLAN group packet flow as an aggregate within the maximum allowed bandwidth of 100 Mbps. According to the present embodiment, as regards high burstable data traffic, it is possible to restrict the maximum bandwidth within a specified value at a network node where a plurality of these burst traffics are multiplexed while allocating a high bandwidth to individual users.

What is claimed is:

1. A shaping apparatus comprising:
an output line interface connected to an output line;
a plurality of flow control units each for buffering variable length frames belonging to an individual flow and determining a timing to output each of the buffered frames in accordance with a maximum allowed bandwidth and a minimum guaranteed bandwidth having been preset;
a read control unit connected to said plurality of flow control units; and
a frame distribution unit for discriminating flows to which variable length frames to be output to said output line belong and selectively distributing each of the variable length frames to any of said flow control units allocated for the flow,
each of said flow control units comprising:
a first frame output timing determination unit which issues a first frame output request for a maximum allowed bandwidth to said read control unit at a frame output timing determined based on the maximum allowed bandwidth preset for each flow;
a second frame output timing determination unit which determines a frame output timing based on the minimum guaranteed bandwidth preset per flow, and issues a second frame output request for a minimum guaranteed bandwidth to said read control unit, when the first frame output request for the maximum allowed bandwidth frame is being issued from said first frame output timing determination unit; and
a frame output controller for outputting one variable length frame to said output line interface in response to output permission received from said read control unit, wherein:
said first frame output timing determination unit has a first leaky bucket based counter structure which decrements a level count value at a decrescent rate in proportion to the maximum allowed bandwidth preset for each flow, each time one of said buffered frames is output by said frame output controller, raises the level count value in accordance with the length of the output frame, and compares the level count value with a first threshold value to determine said frame output timing,
said second frame output timing determination unit has a second leaky bucket based counter structure which decrements a level count value at a decrescent rate in proportion to the minimum guaranteed bandwidth present for each flow, each time one of said buffered frames is output by said frame output controller, raises the level count value in accordance with the length of the output frame, and compares the level count value with a second threshold value to determine said frame output timing, and
said read control unit grants said output permission to one of said flow control units selected by a predetermined algorithm out of flow control units each of which is issuing the first or the second frame output request.

2. The shaping apparatus according to claim 1, wherein:
each of said flow control units further comprises:
a buffer memory for buffering the variable length frames; and
a frame length discriminator for detecting the length of a variable length frame output from said buffer memory,
said first frame output timing determination unit raises the level count value of said first leaky bucket based counter structure in accordance with the output frame length notified from said frame length discriminator, and
said second frame output timing determination unit raises the level count value of said second leaky bucket based counter structure in accordance the output frame length notified from said frame length discriminator.

3. The shaping apparatus according to claim 1, wherein:
said first frame output timing determination unit fixes a lower limit of the level count value to said first threshold value, and
said second frame output timing determination unit permits the level count value to decrease under said second threshold value.

4. The shaping apparatus according to claim 1, wherein:
said read control unit comprises:
a first output candidate determination unit which selects a first flow control unit as a candidate for frame output execution out of a plurality of flow control units each of which is issuing said first frame output request for the maximum allowed bandwidth;
a second output candidate determination unit for selecting a second flow control unit as a candidate for frame output execution out of a plurality of flow control units each of which is issuing said second frame output request for the minimum guaranteed bandwidth; and
an output permission generator which grants said frame output permission to one of said first and said second flow control units determined as the candidates for frame output execution, giving priority to said second flow control unit.

5. A shaping apparatus comprising:
an output line interface connected to an output line;
a plurality of first stage shaping units corresponding to distinct flow groups;

a frame distribution unit for distributing each of variable length frames to be output to said output line to said first stage shaping units selectively; and a second stage shaping unit connected between said plurality of first stage shaping units and said output line interface, each of said first stage shaping units comprising:

a plurality of first flow control units, each of which buffers variable length frames belonging to an individual flow defined in a specific group and determines a timing to output each of the buffered frames in accordance with a maximum allowed bandwidth and a minimum guaranteed bandwidth having been preset for each flow; and a first read control unit which grants frame output permission to one of said first flow control units selected by a predetermined algorithm out of first flow control units each of which is issuing a frame output request, said second stage shaping unit comprising:

a plurality of second flow control units, each of which buffers variable length frames of an individual group output from one of said first stage shaping units and determines a timing to output each of the buffered frames in accordance with the maximum allowed bandwidth and the minimum guaranteed bandwidth having been preset for each flow group; and a second read control unit which grants frame output permission for outputting a frame to said output line interface to one of said second flow control units selected by a predetermined algorithm out of second flow control units each of which is issuing a frame output request, wherein said frame distribution unit discriminates flows to which variable length frames to be output to said output line belong and selectively distributes each of the variable length frames to any of said first flow control units allocated for the flow, and each of said first and second flow control units comprises:

a buffer memory for buffering variable length frames;

a first frame output timing determination unit which issues a first frame output request for the maximum allowed bandwidth to said first or said second read control unit at a frame output timing determined based on the maximum allowed bandwidth preset for each flow;

a second frame output timing determination unit which determines a frame output timing based on the minimum guaranteed bandwidth preset for each flow, and issues a second frame output request for the minimum guaranteed bandwidth to said first or second read control unit only in the duration when the first frame output request for the maximum allowed bandwidth is being issued from said first frame output timing determination unit; and a frame output controller for outputting one variable length frames buffered in said memory in response to output permission received from said first or second read control unit, wherein:

said first frame output timing determination unit has a first leaky bucket based counter structure which decrements a level count value at a decrescent rate in proportion to the maximum allowed bandwidth preset for each flow, each time one of said buffered frames is output by said frame output controller, raises the level count value in accordance with the length of the output frame, and compares the level count value with a first threshold value to determine said frame output timing, a lower limit of the level count being fixed to the first threshold value, and said second frame output timing determination unit has a second leaky bucket based counter structure which decrements a level count value at a decrescent rate in proportion to the minimum guaranteed bandwidth preset for each flow, each time one of said buffered frames is output by said frame output controller, raises the level count value in accordance with the length of the output frame, and compares the level count value with a second threshold value.

6. A flow control method for a communication node having a plurality of input and output ports corresponding to a plurality of input and output lines, respectively, the method comprising the steps of:

switching variable length frames, received over each of said input lines and input to each of said input ports, to any one of said output ports specified by destination information of the received frames;

buffering variable length frames switched to each of said output ports on a flow-by-flow basis for different flows to which the frames belong;

determining a frame output timing, based on a maximum allowed bandwidth having been preset for each flow, and issuing a first frame output request for the maximum allowed bandwidth;

determining a frame output timing, based on a minimum guaranteed bandwidth having been preset for each flow, and issuing a second frame output request for the minimum guaranteed bandwidth, when the first frame output request for the maximum allowed bandwidth frame is being issued; and selecting one of a plurality of frame output requests being issued, giving priority to the second frame output request for the minimum guaranteed bandwidth, and sending out the earliest buffered frame belonging to a flow that is the object of the frame output request to one of said output lines, wherein said first frame output request for the maximum allowed bandwidth is generated by a first leaky bucket based counter which decrements a level count value at a decrescent rate in proportion to the maximum allowed bandwidth preset for each flow, raises the level count value, each time the earliest buffered frame is output, in accordance with the length of the output frame, and compares the level count value with a first predetermined threshold value to determine said frame output timing, a lower limit of the level count value being fixed to the first predetermined threshold value, and wherein said second frame output request for the minimum guaranteed bandwidth is generated by a second leaky bucket based counter which decrements a level count value at a decrescent rate in proportion to the minimum guaranteed bandwidth preset for each flow, raises the level count value, each time the earliest buffered frame is output, in accordance with the length of the output frame, and compares the level count value with a second predetermined threshold value to determine said frame output timing, the level count value being permitted to decrease under the second threshold value.

7. A communication node comprising:

a switch unit having a plurality of input and output ports;

a plurality of input line interfaces connected to the input ports of said switch unit;

a plurality of shaping units connected to the output ports of said switch unit; and a plurality of output line interfaces connected to said shaping units, each of said shaping units comprising:

a plurality of flow control units each for buffering variable length frames belonging to an individual flow and determining a timing to output each of the buffered frames in accordance with a maximum allowed bandwidth and a minimum guaranteed bandwidth having been preset;

a read control unit connected to said plurality of flow control units; and a frame distribution unit for discriminating flows to which variable length frames received from one of said output ports of said switch unit belong and selectively distributing each of the variable length frames to any of said flow control units corresponding to the flow, each of said flow control units comprising:

a first frame output timing determination unit which issues a first frame output request for a maximum allowed bandwidth to said read control unit at a frame output timing determined based on the maximum allowed bandwidth preset for each flow;

a second frame output timing determination unit which determines a frame output timing based on the minimum guaranteed bandwidth preset for each flow, and issues a second frame output request for a minimum guaranteed bandwidth to said read control unit, when the first frame output request for the maximum allowed bandwidth frame is being issued from said first frame output timing determination unit; and a frame output controller for outputting one variable length frame to said output line interface in response to output permission received from said read control unit, wherein:

said first frame output timing determination unit has a first leaky bucket based counter structure which decrements a level count value at a decrescent rate in proportion to the maximum allowed bandwidth preset for each flow, each time one of said buffered frames is output by said frame output controller, raises the level count value in accordance with the length of the output frame, and compares the level count value with a first threshold value to determine said frame output timing, a lower limit of the level count being fixed to the first threshold value, said second frame output timing determination unit has a second leaky bucket based counter structure which decrements a level count value at a decrescent rate in proportion to the minimum guaranteed bandwidth preset for each flow, each time one of said buffered frames is output by said frame output controller, raises the level count value in accordance with the length of the output frame, and compares the level count value with a second threshold value to determine said frame output timing, and said read control unit grants said output permission to one of said flow control units selected by a predetermined algorithm out of flow control units each of which is issuing the first or the second frame output request.

8. The communication node according to claim 7, wherein each of said flow control units further comprises:

a buffer memory for buffering variable length frames; and a frame length discriminator for detecting the length of a variable length frame output from said buffer memory, wherein said first frame output timing determination unit raises the level count value of said first leaky bucket based counter structure in accordance with the output frame length notified from said frame length discriminator, and said second frame output timing determination unit raises the level count value of said second leaky bucket based counter structure in accordance with the output frame length notified from said frame length discriminator.

9. The communication node according to claim 8, wherein said read control unit comprises:

a first output candidate determination unit which selects a first flow control unit as a candidate for frame output execution out of a plurality of flow control units each of which is issuing said first frame output request for the maximum allowed bandwidth frame;

a second candidate determination unit for selecting second flow control unit as a candidate for frame output execution out of a plurality of flow control units each of which is issuing said second output request for the minimum guaranteed bandwidth frame; and an output permission generator which grants said frame output permission to one of said first and said second flow control units determined as the candidates for frame output execution, giving priority to said second flow control unit.

* * * * *